US011941898B2

(12) United States Patent
Kosuge et al.

(10) Patent No.: US 11,941,898 B2
(45) Date of Patent: Mar. 26, 2024

(54) THREE-DIMENSIONAL POSITION AND POSTURE RECOGNITION DEVICE AND METHOD

(71) Applicant: Hitachi, Ltd., Tokyo (JP)

(72) Inventors: Atsutake Kosuge, Tokyo (JP); Takashi Oshima, Tokyo (JP); Yukinori Akamine, Tokyo (JP); Keisuke Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 389 days.

(21) Appl. No.: 17/295,148

(22) PCT Filed: Dec. 19, 2019

(86) PCT No.: PCT/JP2019/049858
§ 371 (c)(1),
(2) Date: May 19, 2021

(87) PCT Pub. No.: WO2020/130085
PCT Pub. Date: Jun. 25, 2020

(65) Prior Publication Data
US 2022/0019762 A1  Jan. 20, 2022

(30) Foreign Application Priority Data
Dec. 21, 2018 (JP) .................. 2018-239421

(51) Int. Cl.
*G06K 9/00* (2022.01)
*B25J 13/08* (2006.01)
(Continued)

(52) U.S. Cl.
CPC .......... *G06V 20/653* (2022.01); *B25J 13/089* (2013.01); *G06T 7/75* (2017.01)

(58) Field of Classification Search
CPC ...... G06V 20/64; G06V 20/653; G06V 10/00; G06V 10/10; G06V 10/20; G06V 10/22;
(Continued)

(56) References Cited

U.S. PATENT DOCUMENTS

2003/0067461 A1    4/2003  Fletcher et al.
2009/0202155 A1*   8/2009  Hayashi .................. G01S 17/89
                                                       382/203

(Continued)

FOREIGN PATENT DOCUMENTS

JP       2010-23950 A     2/2010
JP       2013-137591 A    7/2013

OTHER PUBLICATIONS

Gomes, Rafael Beserra, et al. "Efficient 3D object recognition using foveated point clouds." Computers & Graphics 37.5 (2013): 496-508. (Year: 2013).*

(Continued)

*Primary Examiner* — Edward F Urban
*Assistant Examiner* — Duy Tran
(74) *Attorney, Agent, or Firm* — MATTINGLY & MALUR, PC

(57) ABSTRACT

A three-dimensional position and posture recognition device speeds estimation of a position posture and a gripping coordinate posture of a gripping target product. The device includes: a sensor unit configured to measure a distance between an image of an object and the object; and a processing unit configured to calculate an object type included in the image, read model data of each object from the external memory, and create structured model data having a resolution set for each object from the model data, generate measurement point cloud data of a plurality of resolutions from information on a distance between an image of the object and the object, perform a K neighbor- (Continued)

hood point search using the structured model data and the measurement point cloud data, and perform three-dimensional position recognition processing of the object by rotation and translation estimation regarding a point obtained from the K neighborhood point search.

4 Claims, 9 Drawing Sheets

(51) Int. Cl.
  *G06T 7/73* (2017.01)
  *G06V 20/64* (2022.01)
(58) Field of Classification Search
  CPC ............ G06V 30/1444; G06V 30/19; G06V 30/19007; G06V 30/19053; G06V 30/19093; G06V 30/1988; G06V 30/26; G06V 40/00; G06T 7/70; G06T 7/73; G06T 7/75; G06T 7/80; G06T 3/00; G06T 3/4053; G06T 3/4092; G06T 3/403; G06T 3/4038; G06T 5/00; G06T 5/002; G06T 5/006; G06T 7/00; G06T 7/162; G06T 7/33; G06T 7/337; G06T 7/344; G06T 17/00; G06T 19/20; G06T 2207/20041; G06T 2207/20072; G06T 2207/20172; G06T 2219/00; B25J 13/088; B25J 13/089; B25J 13/08; B25J 13/086

See application file for complete search history.

(56) References Cited

U.S. PATENT DOCUMENTS

| | | | | |
|---|---|---|---|---|
| 2010/0017407 | A1* | 1/2010 | Beniyama | G06F 16/5854 707/E17.016 |
| 2011/0273442 | A1* | 11/2011 | Drost | G06V 10/757 345/419 |
| 2013/0245828 | A1* | 9/2013 | Tateno | G06V 20/653 700/259 |

OTHER PUBLICATIONS

International Search Report of PCT/JP2019/049858 dated Jan. 28, 2020.

* cited by examiner

[FIG. 1A]
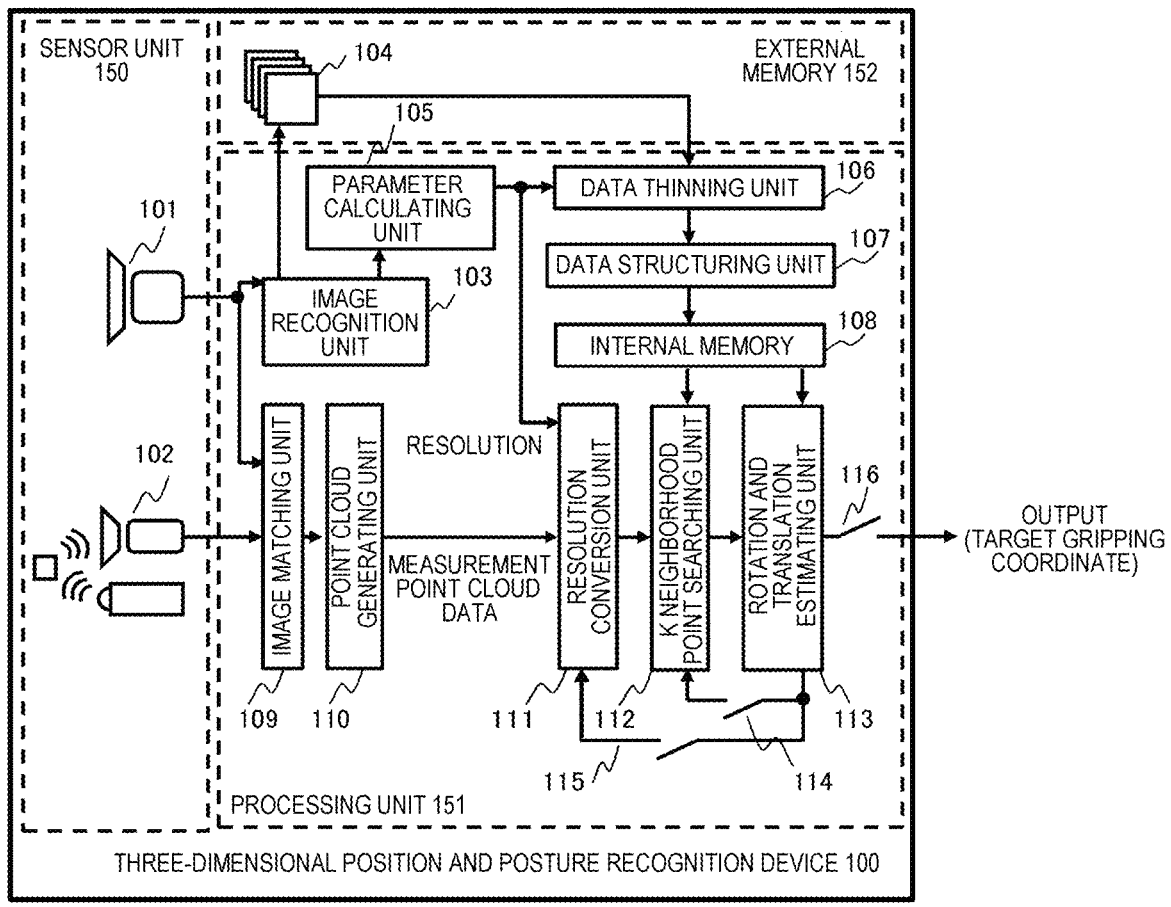

[FIG. 1B]
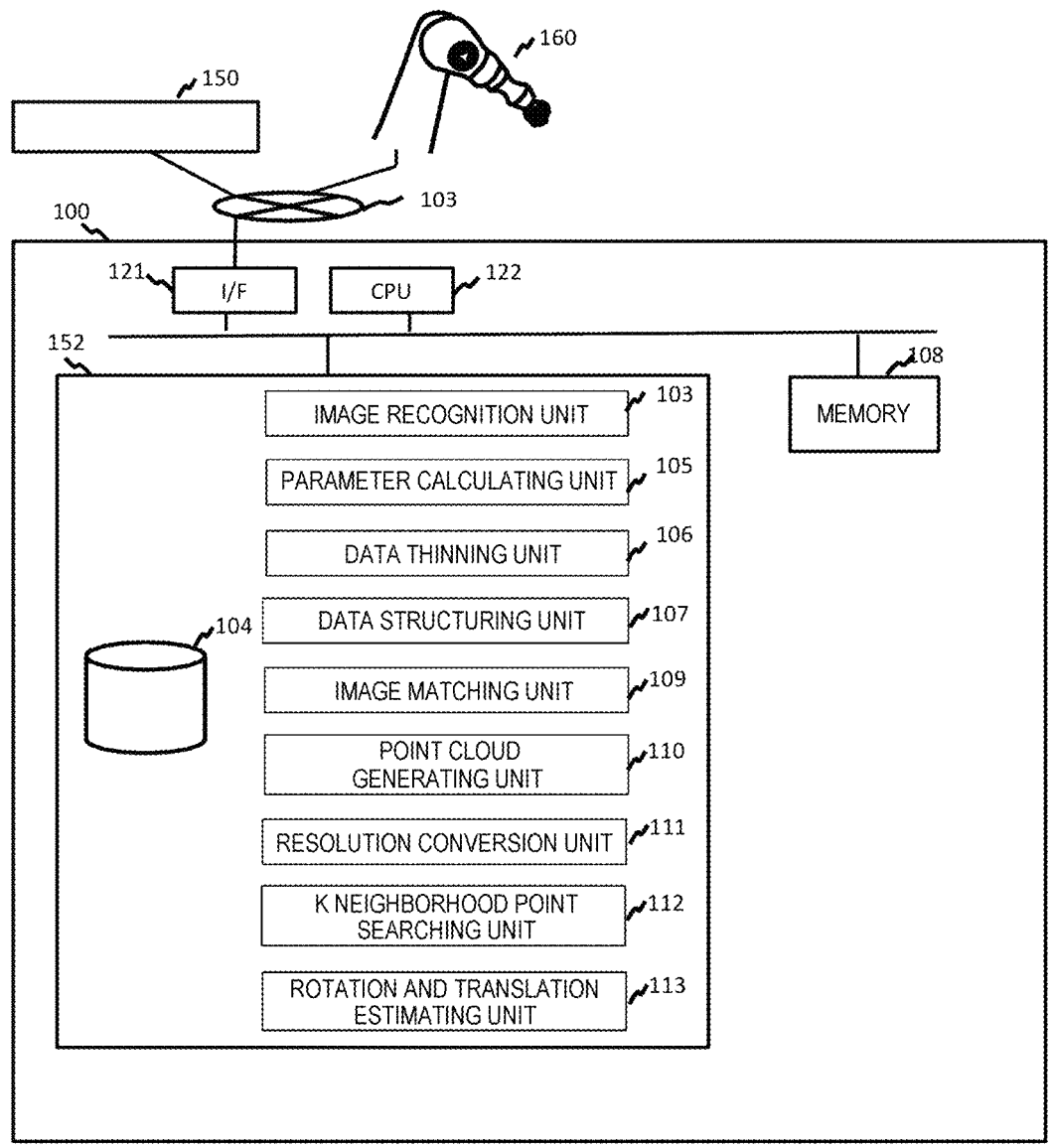

[FIG. 2]
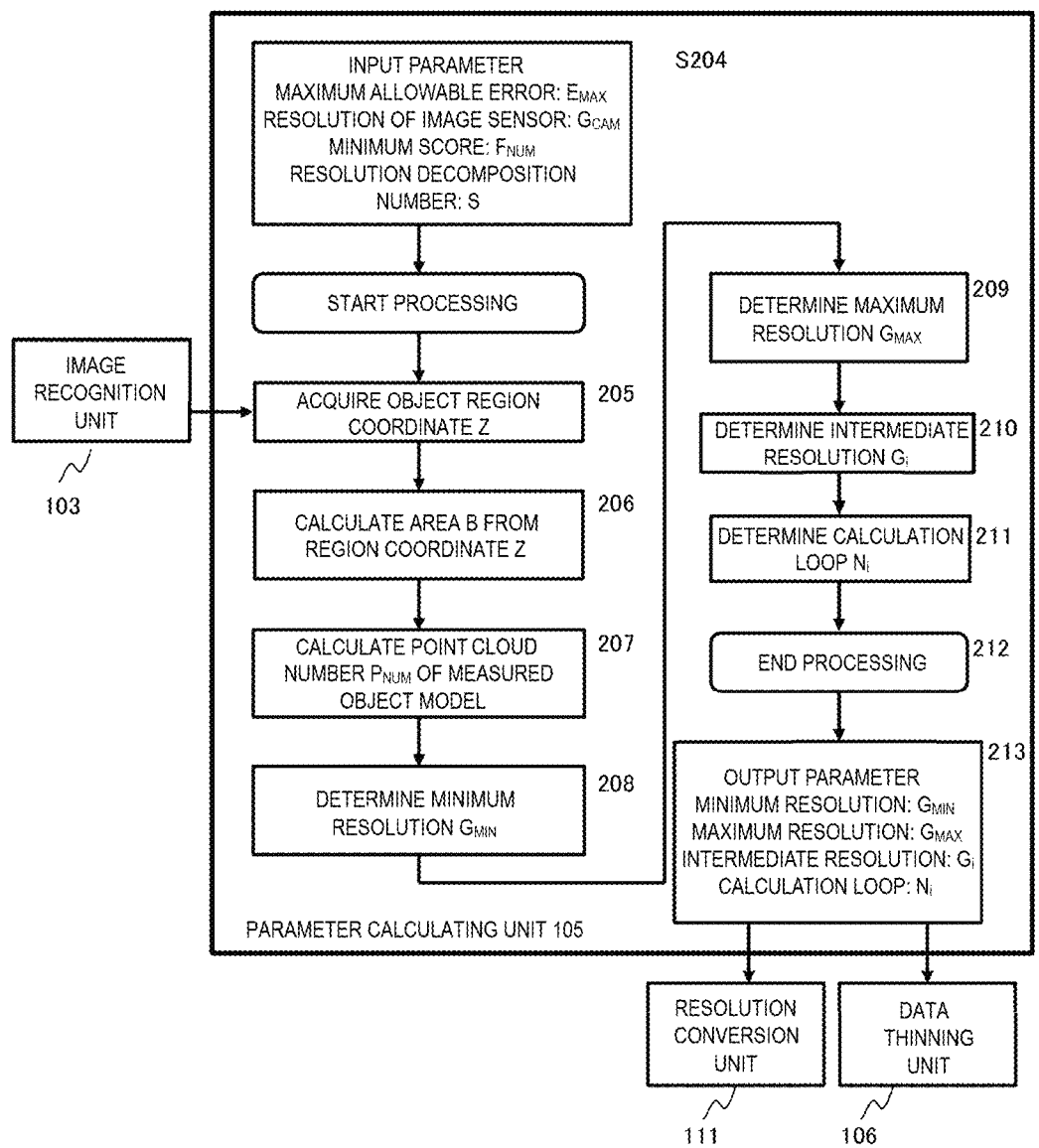

[FIG. 3A]
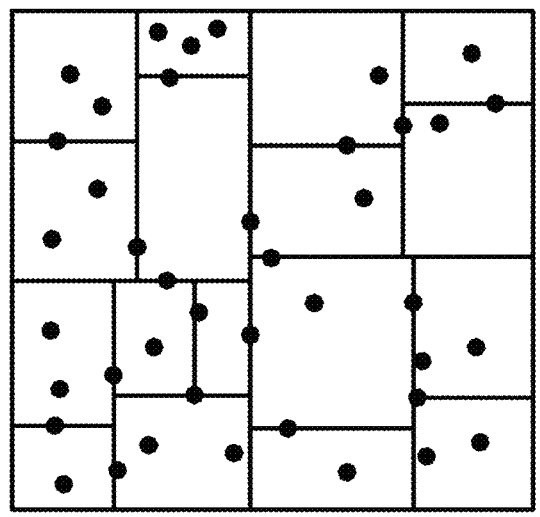
SPACE DIVISION IN K-D TREE STRUCTURING METHOD
[FIG. 3B]
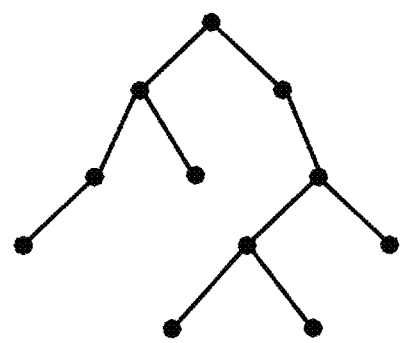
DATA STRUCTURING BY K-D TREE STRUCTURE

[FIG. 3C]
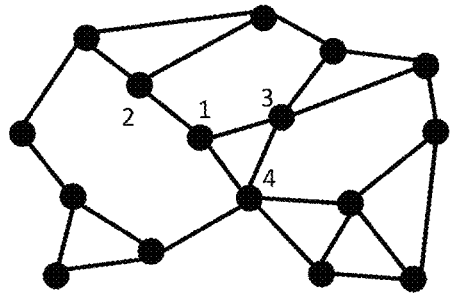
DATA STRUCTURING BY GRAPH STRUCTURE
| Query Point ID | 1 | | |
|---|---|---|---|
| Neighbor Point ID | 4 | 3 | 2 |
| Distance | 0.02 | 0.03 | 0.05 |
301
DATA FORMAT IN GRAPH STRUCTURE
[FIG. 3D]
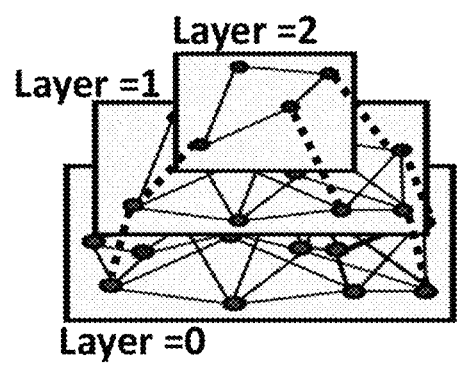
DATA HIERARCHICAL STRUCTURING BY HIERARCHICAL GRAPH

[FIG. 4A]
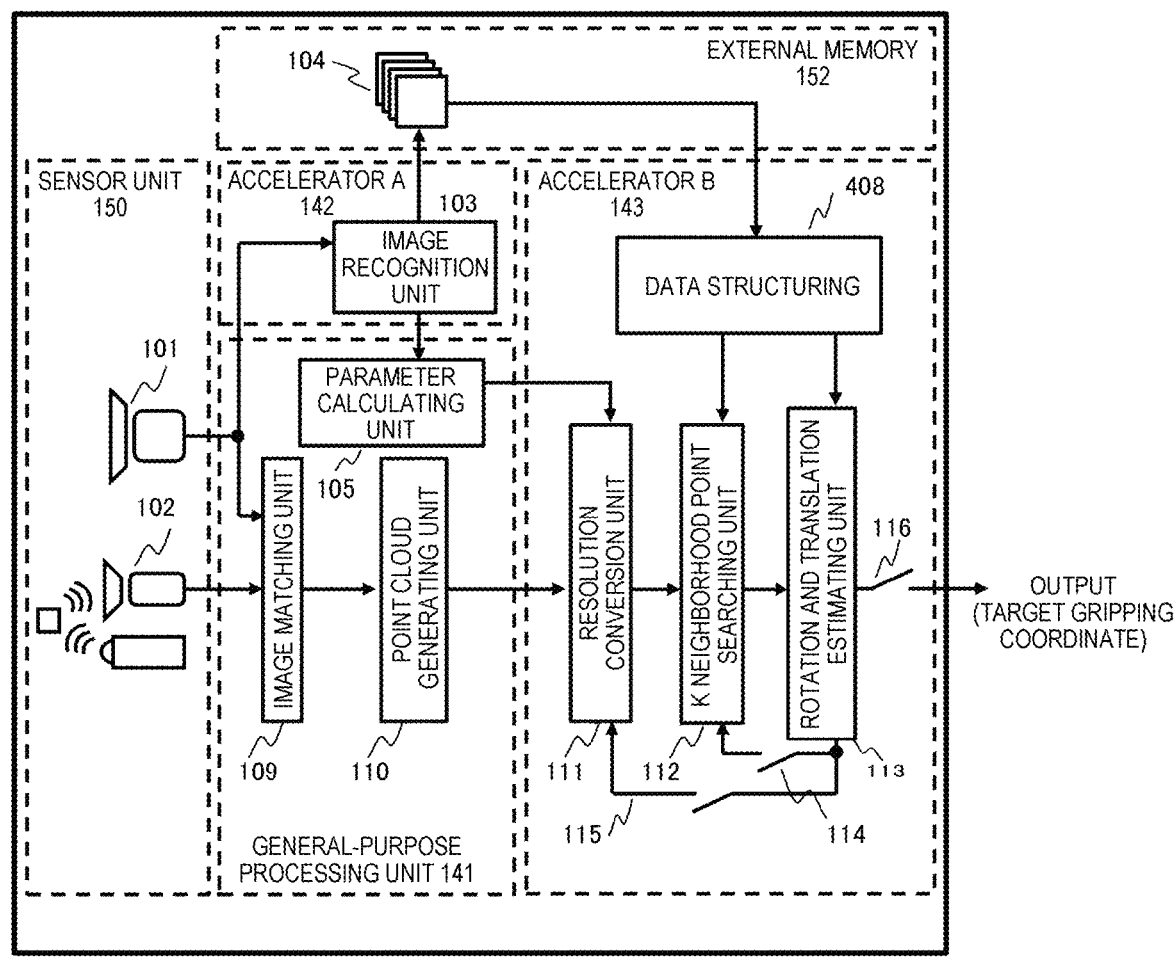

[FIG. 4B]
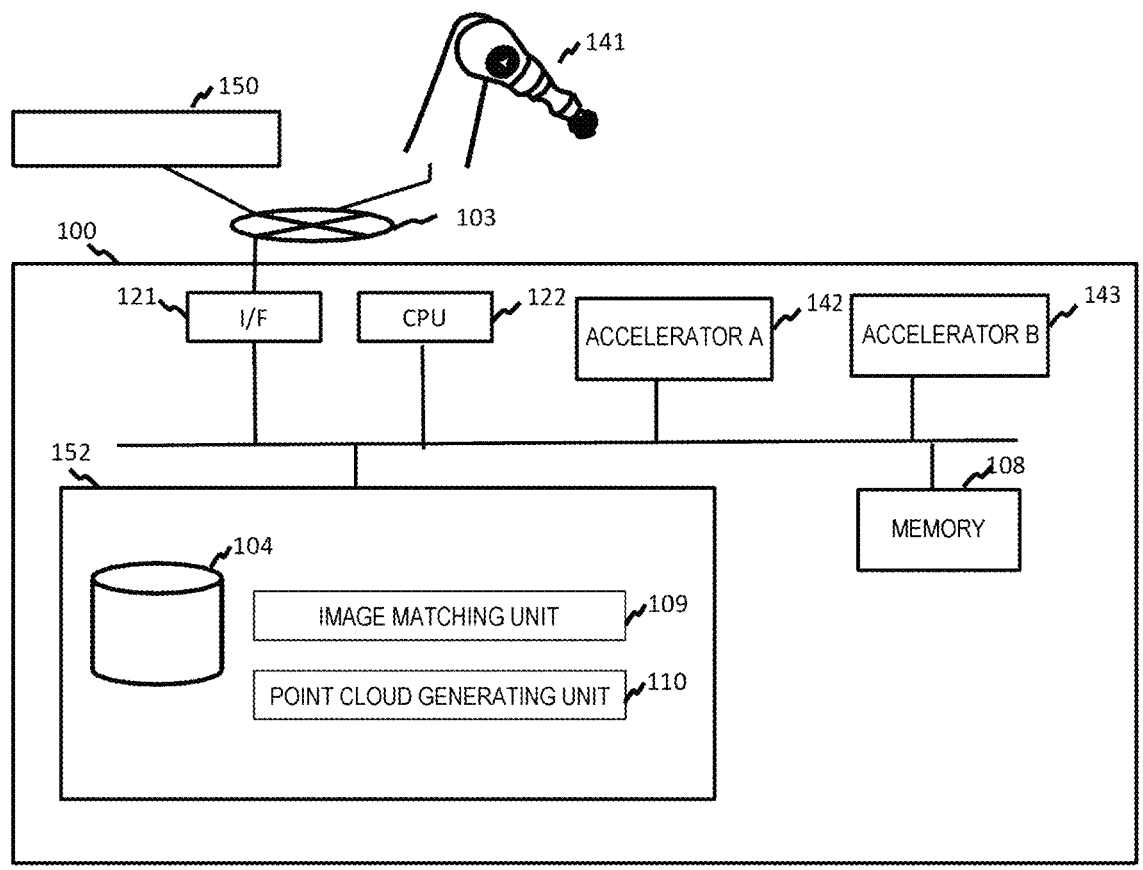

[FIG. 5]
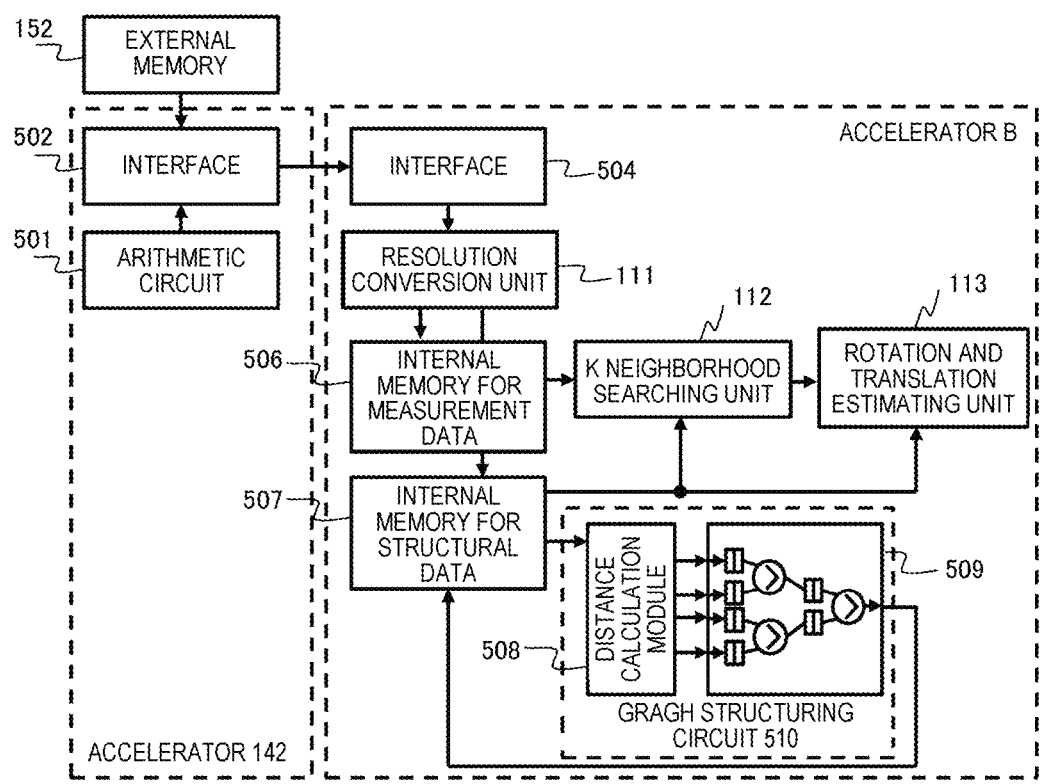

[FIG. 6]
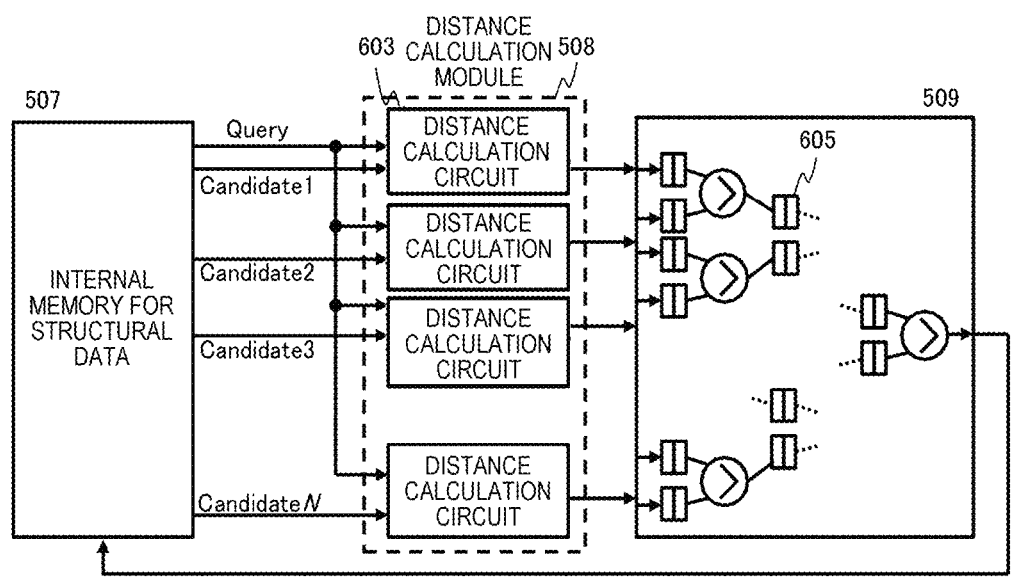

THREE-DIMENSIONAL POSITION AND POSTURE RECOGNITION DEVICE AND METHOD

TECHNICAL FIELD

The present invention relates to a three-dimensional position and posture recognition technique. In particular, the present invention relates to a three-dimensional position and posture recognition technique of a product for a product picking operation in an autonomous control robot.

BACKGROUND ART

In a background of insufficient work force, automation of manual work by introduction of a robot is progressing. Until now, automation of routine work such as component cutting and welding work in factories has progressed. In the future, an introduction of robots will be further expanded, and development directed to application in three industrial fields such as construction sites, distribution warehouses, food, cosmetics, and medical products will be activated.

Automation of product picking operation in the distribution warehouse can be given as an example. Ina picking operation automation robot, a three-dimensional image of an article shelf is acquired by a depth sensor and an image sensor attached to a tip of a robot arm, presence or absence of a target product is detected by image recognition, and gripping coordinates are calculated while comparing the detected three-dimensional image with three-dimensional model data of a product registered in advance. A trajectory is calculated according to the obtained gripping coordinates, and picking is performed.

PTL 1 discloses a technique for recognizing such an arrangement of objects. PTL 1 discloses a three-dimensional object recognition system that includes a sensor configured to measure a distance to an object, a movement mechanism configured to move the sensor, an object information database connected to the sensor and storing at least a shape of the object, an object arrangement database storing an arrangement pattern of the object, a sensor data integration unit configured to input sensor data obtained by measuring a distance from the sensor to the object along with movement of the sensor by the movement mechanism and a position of the sensor from which the sensor data is obtained, and output integrated data indicating a contour of the object obtained by integrating the sensor data in a three-dimensional space according to the position of the sensor, and an object comparison arithmetic unit configured to create an object model from the shape of the object stored in the object information database, compare the created object model with the integrated data with reference to the arrangement pattern of the object stored in the object arrangement database, and output object actual arrangement data indicating an actual arrangement of the object.

CITATION LIST

Patent Literature

PTL 1: JP-A-2010-23950

SUMMARY OF INVENTION

Technical Problem

PTL 1 does not refer to speeding up of arithmetic processing in a data structure type neighborhood search. For example, a position posture and the gripping coordinates of a gripping target product are calculated by an arithmetic operation called iteractive closest point (ICP). In ICP, while three-dimensional model data of the product is rotated and translated, a rotation and translation matrix well fitted to measurement data of an article shelf is calculated. Since the calculation is repeated, calculation time is long, and it is considered that it is difficult to increase the speed by parallelization. Therefore, this becomes a factor that an efficiency of the picking operation by the robot is deteriorated as compared with a human operator. Although it is necessary to perform image recognition, posture estimation, and trajectory calculation in the arithmetic processing for the picking operation, the inventor has focused on a fact that the calculation of the posture estimation occupies 80% or more of the whole, and has found that speeding up of the calculation for the posture estimation is important for speeding up the arithmetic processing of the picking operation.

Therefore, an object of the invention is to provide a three-dimensional position and posture recognition device and method capable of speeding up estimation of a position posture and a gripping coordinate posture of a gripping target product, that is, speeding up the ICP.

Solution to Problem

An example of a three-dimensional position recognition device according to the invention that solves the above problem includes: an external memory configured to store model data of each object; a sensor unit configured to measure a distance between an image of an object and the object; and a processing unit connected to the external memory and the sensor unit. The processing unit calculates an object type included in the image based on information from the sensor unit, reads model data of each object from the external memory according to the object type, and creates structured model data having a resolution set for each object from the model data, generates measurement point cloud data of a plurality of resolutions from information on a distance between an image of the object and the object from the sensor unit, performs a K neighborhood point search using the structured model data and the measurement point cloud data of each resolution of the measurement point cloud data of the plurality of resolutions, and performs three-dimensional position recognition processing of the object by rotation and translation estimation regarding a point obtained from the K neighborhood point search.

Another example of the three-dimensional position recognition device according to the invention includes: an external memory configured to store model data of each object; a sensor unit configured to acquire distance information between a two-dimensional image of an object and the object; an image recognition unit configured to output an object type and an object region coordinate based on the two-dimensional image of the object acquired by the sensor unit; a parameter calculating unit configured to output resolution for each object based on the object type and the object region coordinate from the image recognition unit, and an allowable error of each object; a data thinning unit configured to output, based on the resolution from the parameter calculating unit, thinned data from model data of the object read from the external memory according to the object type from the image recognition unit; a data structuring unit configured to generate structured model data from the thinned data; an internal memory configured to store the structured model data generated by the data structuring unit; a point cloud generating unit configured to generate the measurement point cloud data from the two-dimensional image acquired from the sensor unit; a resolution conversion unit configured to output the measurement point cloud data as measurement point cloud data of a plurality of resolutions after resolution conversion; a K neighborhood point searching unit configured to perform K neighborhood point search using the structured model data stored in the internal memory and the predetermined measurement point cloud data from the resolution conversion unit; a rotation and translation estimating unit configured to perform rotation and translation estimation using output of the K neighborhood point searching unit, and the structured model data stored in the internal memory; a first loop that repeats processing of the K neighborhood point searching unit and the rotation and translation estimating unit until an error of the structured model data stored in the internal memory and the measurement point cloud data of the resolution conversion unit is a certain value or less; and a second loop that repeats the processing of the K neighborhood point searching unit and the rotation and translation estimating unit with respect to measurement point cloud data of the plurality of the resolutions from the resolution conversion unit.

Advantageous Effect

According to the invention, it is possible to speed up the estimation of the position posture and the gripping coordinate posture of the gripping target product. It is possible to shorten data structuring calculation time in a data structure-type neighborhood point search. For example, it is possible to shorten calculation time for calculating a gripping position of the product by a robot arm.

Problems, configurations, and effects other than those described above will be apparent with reference to the description of following embodiments.

BRIEF DESCRIPTION OF DRAWINGS

FIG. 1A is a schematic diagram of a three-dimensional position and posture recognition device.
FIG. 1B is a hardware configuration diagram of the three-dimensional position and posture recognition device.
FIG. 2 is a diagram for describing processing of a parameter calculating unit.
FIG. 3A is a diagram for describing a space division in a K-D tree structuring method.
FIG. 3B is a diagram for describing data structuring by a K-D tree structure.
FIG. 3C is a diagram showing data structuring and a data format based on a graph structure.
FIG. 3D is a diagram showing data hierarchical structuring based on a hierarchical graph.
FIG. 4A is a diagram showing a three-dimensional position and posture recognition device using an accelerator.
FIG. 4B is a hardware configuration diagram of the three-dimensional position and posture recognition device using the accelerator.
FIG. 5 is a diagram for describing processing of the accelerator that performs a data structure type neighborhood search.
FIG. 6 is a detailed diagram showing distance calculation processing and hardware implementation processing of a rearrangement processing unit in a data structuring calculation.

DESCRIPTION OF EMBODIMENTS

Hereinafter, an embodiment of the invention will be described with reference to the drawings. The following description and drawings are examples for describing the invention, and are omitted and simplified as appropriate for clarification of the description. The invention can be implemented in various other forms. Unless otherwise limited, each component may be singular or plural.

In the following description, although various types of information may be described in terms of expressions such as "table", "list" and "queue", the various types of information may be expressed by other data structures. "XX table", "XX list", and the like are referred to as "XX information" to indicate that the information does not depend on a data structure. When identification information is described, expressions such as "identification information", "identifier", "name", "ID", and "number" are used, but these expressions may be replaced with each other.

When there are a plurality of constituent elements having the same or similar functions, although the same reference numerals are basically given to the constituent elements in the description, means for achieving the functions may be different even if the functions are the same.

In the following description, processing performed by executing a program may be described. The program is executed by a processor which is a central processing unit (for example, a CPU) to appropriately perform a predetermined processing using a storage resource (for example, a memory) and/or an interface device (for example, a communication port), or the like. Therefore, the processor may serve as a subject of the processing.

The program may be installed from a program source into a device such as a computer. The program source may be, for example, a program distribution server or a computer-readable storage medium. When the program source is the program distribution server, the program distribution server may include a processor and a storage resource that stores a program to be distributed, and the processor of the program distribution server may distribute the program to be distributed to another computer. In the following description, two or more programs may be implemented as one program, or one program may be implemented as two or more programs.

In ICP, measurement data and model data are input, and both of the measurement data and the model data are point cloud data in which distance information is added to each pixel of a two-dimensional image. The ICP includes two types of calculations: step (1) an association calculation between points, and step (2) a rotation and translation matrix estimation. The association between the points in step (1) is calculated by a neighborhood point search method. Actually, not only one nearest neighbor point but also K candidate points are calculated, and a gravity center among the points is selected as a corresponding point. In step (2), a rotation and translation matrix is obtained based on the correspondence between the obtained points. Steps (1) and (2) are repeated until a sum of the distances becomes minimum, and the posture estimation of the measurement data is performed on the model data. For example, an article is measured, and a gripping position or the like of the article by a robot is calculated based on the measurement data and the model data.

First Embodiment

An outline of a representative embodiment of the invention will be described. FIG. 1A is a diagram showing an outline of a three-dimensional position and posture recognition device 100 according to a representative embodiment. As shown in FIG. 1A, the three-dimensional position and posture recognition device 100 includes a sensor unit 150, a processing unit 151, and an external memory unit 152.

In the sensor unit 150, an image sensor 101 acquires a two-dimensional image including a plurality of pixel data of a recognition target object. A depth sensor 102 acquires distance information between each point on a surface of the recognition target object and the depth sensor. As the depth sensor 102, a method called a time of flight (ToF) method in which a distance is obtained from a phase displacement amount between a transmitted reference signal and a reflected signal, or a structured-light method in which a pattern light is radiated to a measurement target by a projector and a pattern displacement amount is observed by an image sensor to obtain a distance is frequently used.

An image recognition unit 103 performs object recognition on the image obtained by the image sensor 101, calculates and outputs the object type and region coordinates of the object in the image. When there are a plurality of target objects, an object type and region coordinates of the object in the image are output for each object. A method such as deep learning is used for image recognition of the image recognition unit 103.

The processing unit 151 extracts data matching the object type from the plurality of model data 104 stored in the external memory 152 based on the object type output from the image recognition unit 103, and stores the data in an internal memory 108 in the processing unit. In parallel, the processing unit 151 transmits the data of the object type and the region coordinates of the object in the image output from the image recognition unit 103 to a parameter calculating unit 105.

In the parameter calculating unit 105, a resolution used in a data thinning unit 106 and a resolution conversion unit 111 of the measurement data, the number of loops used in the loop processing 114 and 115, and the like are determined based on the data of the object type and the region coordinates. Details of the parameter calculating unit 105 will be described with reference to FIG. 2.

The model data 104 is model point cloud data including a point cloud. The model data 104 transmitted from the external memory 152 to the processing unit 151 is transmitted to the data thinning unit 106, and thinning of data from the model data is performed based on the resolution determined by the parameter calculating unit 105. The thinned model data is subjected to data structuring processing for neighborhood point search in a data structuring unit 107.

The structured model data structured by the data structuring unit 107 is stored in the internal memory 108 in the processing unit, and is used in a K neighborhood point searching unit 112 and a rotation and translation matrix estimating unit 113. The structured model data is data that is frequently referred to by the K neighborhood point search unit 112 and the rotation and translation matrix estimating unit 113, and thus speeding up is performed by arranging the data in the internal memory 108 instead of the external memory 152.

A color image (two-dimensional image including a plurality of pixel data) obtained by the image sensor 101 and depth data obtained by the depth sensor 102 are sent to an image matching unit 109 of the processing unit 151, and are converted into data in which a field of view and the position coordinates thereof are aligned with each other. A conversion matrix used in image matching processing of the image matching unit 109 is accurately obtained by calibration of an optical axis, a calibration method based on a reference image, or the like.

Next, a point cloud generating unit 110 converts the data of the image sensor 101 and the depth sensor 102, which are converted by the image matching unit 109 and whose position coordinates are aligned with each other, into point cloud data (measurement point cloud data). That is, the data is converted into the measurement point cloud data in which the depth data of the depth sensor 102 is added to each pixel of the color image of the image sensor 101.

Since the measurement point cloud data output from the point cloud generating unit 110 is based on a resolution division ICP algorithm, the resolution conversion unit 111 performs resolution conversion based on the resolution determined by the parameter calculating unit 105.

Next, the K neighborhood point searching unit 112 calculates K points close to each point of the thinned measurement data in the structured model data calculated by the data structuring unit 107. Subsequently, a position of the gravity center of the K points is calculated.

Subsequently, the rotation and translation estimating unit 113 calculates a rotation and translation matrix by a calculation method represented by a specific value decomposition method using the obtained position of the gravity center. A distance between the position of the gravity center of the structured model data and each point of the corresponding measurement point cloud data is obtained, and it is confirmed whether an average distance satisfies a condition of the number of times of calculation set by the parameter calculating unit 105. The loop processing by the loop 114 is executed until the condition of the number of times of calculation is satisfied.

When the loop processing 114 is satisfied, similar calculation is performed by the loop processing by the loop 115 at the next resolution (the resolution is gradually selected from a low resolution to a high resolution) calculated by the parameter calculating unit 105. The resolution conversion unit 111 converts the measurement data into data having a more detailed resolution. In a related-art method, it is necessary to change the resolution of the structured model data in accordance with the change in the resolution of the measurement data, and the processing of the data thinning unit 106 and the processing of the data structuring unit 107 are repeatedly executed with reference to the structured model data having the changed resolution. However, in general, a large number of rearrangement processing occur in the processing of the data structuring unit 107, and reference and data exchange to the external memory 152 frequently occur, and thus calculation time tends to increase.

Therefore, in the first embodiment, even when the resolution of the measurement data is changed, regenerating processing of the structured model data is not necessary, and the structured model data can be reused, and thus, at the beginning of the processing of the parameter calculating unit 105, structured model data is created with a required minimum resolution. Although the processing will be described with reference to FIG. 2, the processing is achieved by designating an allowable error for each object type in the parameter calculating unit 105 and calculating a minimum resolution for creating the structured model data based on the allowable error (the minimum resolution is a term for making a description easy to understand and does not need to be the minimum resolution as long as the resolution is calculated based on an allowable error from a user). As a result, a calculation number of times of the processing of the data thinning unit 106 and the processing of the data structuring unit 107 is inhibited to one, which is the minimum, and thus the calculation time can be greatly shortened.

When the calculation is completed for all resolutions designated by the parameter calculating unit 105, the loop processing 115 is satisfied and the calculation is completed. Finally, the gripping coordinates are calculated from the rotation and translation matrix estimating unit 113 of the target object, and a calculation result is output to an output unit 116.

FIG. 1B is a hardware configuration diagram of the three-dimensional position and posture recognition device according to the first embodiment. The three-dimensional position and posture recognition device 100 includes an interface 121 for communicating with an external device, an input and output device (not shown), a processing unit (central processing unit) 122, the memory 108, and a storage device 152 including an HDD, an SSD, and the like.

The CPU 122 reads the various programs 103 to 113 stored in the storage device 152 into the memory 108 and executes the various programs, thereby achieving various functions described with reference to FIG. 1A. The memory 108 stores various programs executed by the CPU 122 and temporarily stores processing results of the CPU 122.

Here, the various programs are the image recognition unit 103, the parameter calculating unit 105, the data thinning unit 106, the data structuring 107, the image matching unit 109, the point cloud generating unit 110, the resolution conversion unit 111, the K neighborhood point search unit 112, and the rotation and translation estimating unit 113 described with reference to FIG. 1A. The CPU 122 executes the programs, thereby achieving the various processing described with reference to FIG. 1A.

FIG. 2 is a diagram for describing processing of the parameter calculating unit 105. In step 204, the following information is input to the parameter calculating unit 105: an allowable error, which is a parameter set in advance by the user (although the allowable error is referred to as a maximum allowable error in order to make a description easier to understand, the allowable error is not necessarily required to be the maximum, and is a value set by the user) ($E_{MAX}$), a resolution of the image sensor 101 ($G_{CAM}$), a minimum score ($F_{NUM}$), and a resolution decomposition number (S).

$E_{MAX}$ is the maximum allowable error determined in advance for each object (for example, a product gripped by a robot arm 160). By setting the $E_{MAX}$ for each product, the gripping position of the product is obtained, and therefore the minimum resolution when the structured model data is created from the model data can be obtained, and by referring to the structured model data created at the minimum resolution, comparison with measurement point data of various resolutions can be performed. Therefore, even if the resolution of the measurement point data is changed, it is not necessary to create the structured model data at each resolution, and the gripping position of the product can be obtained at high speed.

$F_{NUM}$ is the minimum number of points required to ensure the minimum calculation accuracy, and is usually defined as several hundred points. S is a value that determines how many times the loop processing 115 is repeated, and is usually defined to be several times.

An object region coordinate Z output from the image recognition unit 103 is acquired (S205), and an object area B in the measurement image is calculated (S206).

By using the resolution $G_{CAM}$ of the image sensor and the object area B, the point cloud number $P_{NUM}$ of a measured object model is calculated by $P_{NUM}=B \times G_{CAM}$ (S207).

In step (S208), a minimum resolution ($G_{MIN}$) is calculated by $G_{MIN}=G_{CAM} \times P_{NUM}/F_{NUM}$.

In step (S209), the maximum resolution ($G_{MAX}$) is set to the same distance resolution as the maximum allowable error ($E_{MAX}$).

In step (S210), in the loop processing 114, the i-th resolution ($G_i$) is calculated by using the maximum resolution ($G_{MAX}$) and the minimum resolution ($G_{MIN}$) ($G_i=G_{MIN}+i \times (G_{MAX}-G_{MIN})/S$). This is because the processing of the K neighborhood point search unit 112 and the rotation and translation estimating unit 113 is performed first by gradually increasing the resolution from a low resolution measurement point cloud data. As a result, the processing of the K neighborhood point search unit 112 and the rotation and translation estimating unit 113 is performed roughly at first, and the resolution is gradually increased, and thus, for example, calculation of a target gripping position of the product can be performed at high speed and with high accuracy.

In step (S211), the i-th number of loops ($N_i$) in the loop processing 115 and the loop processing 114 is calculated. The i-th loop is set to about several hundred times, and the number of loops is calculated to be reduced as i is larger. The determined parameters are sent to the resolution conversion unit 111 and the data thinning unit 106.

That is, among the output parameters, the maximum resolution $G_{MAX}$ is output to the data thinning unit 106 and the resolution conversion unit 111, the minimum resolution $G_{MIN}$ and the intermediate resolution $G_i$ are output to the resolution conversion unit 111, and the number of times of calculation $N_i$ is output to the loop processing 114 and 115.

In the data structuring unit 107, the data structuring for the neighborhood point search is performed. In related arts, a K-D tree structure is often used for the data structuring. As shown in FIG. 3A, in K-D tree structuring processing, a space is divided by axes passing through representative points, and each data point shown in FIG. 3B is registered in a tree structure. A data point which is a median value of a division target region is selected as the representative point. In the case of performing a neighborhood search, a data point registered at the end of the tree structure is searched while comparing a magnitude relationship between the data and the representative point of each axis. In the neighborhood point search using the K-D tree structure, although one neighborhood point search is performed at a high speed, it is necessary to repeat the calculation K times to calculate the K neighborhood points, and an enormous amount of calculation time is still required in ICP.

Therefore, in the first embodiment, a hierarchical graph type neighborhood point search capable of collectively calculating K neighborhood points shown in FIGS. 3C and 3D is used. As shown in FIG. 3C, in the hierarchical graph type neighborhood point search, a graph in which data points are connected to each other as vertices is constructed. A distance between the data points is calculated and stored as a length of each side of the graph. Only K sides of the graph are selected and stored in an ascending order. Therefore, when the neighborhood point search is performed on structured data and one neighborhood point is searched, K neighborhood points close to the neighborhood point can be searched at the same time without calculation, and the calculation can be speeded up. A data format 301 of the hierarchical graph is shown. First, each data point is selected as a Query point, and a distance from a peripheral point is calculated. The IDs and the distances are rearranged in the ascending order of distance, and only a plurality of top multiple points are registered as Neighbor points for each Query point. The Query point is executed for all data points. In FIG. 3C, a Query point [1] is selected, and Neighbor point IDs [2], [3], and [4] are assigned to peripheral points [2], [3], and [4], respectively. For the Neighbor point IDs, distances [0.05] [0.03] [0.02] from the Query point [1] to each point are registered.

Here, as shown in FIG. 3D, in order to reduce a calculation amount for graph construction, the data is divided similarly as a K-D tree, and the graph is created only in the divided region. The divided regions are reduced only to the representative points, and a graph is further constructed and hierarchized only by the representative points. Layer 0 in FIG. 3D is detailed data, and Layer 2 is reduced data.

A rotation and translation matrix satisfying the condition in the rotation and translation estimating unit 113 is given. The gripping coordinates specified in the model point cloud data are multiplied by the obtained rotation and translation matrix, and thereby, the target gripping coordinates are calculated and output from the device by multiplying the gripping coordinates designated in the model point cloud data by the obtained rotation and translation matrix.

Briefly summarizing the above operations, in order to speed up the neighborhood point search method that occupies most of the calculation in the ICP calculation, a data structuring neighborhood point search is introduced into a resolution decomposition type ICP. The model data of the object called based on an image recognition result is subjected to a thinning processing based on a certain resolution, and is subjected to the data structuring processing such as hierarchical graphing. As the resolution, the required minimum value is obtained from a calculation error allowed for the object and applied.

The structured data is stored in the internal memory 108, and is used for evaluation of calculation results in the K neighborhood point search 112 and the rotation and translation estimating 113. In the resolution decomposition type ICP, the calculation is repeated until a calculation accuracy satisfies a certain condition by the loop processing 114, and thereafter, the calculation is shifted to the calculation for the next resolution by the loop processing 115. The resolution conversion unit 111 converts the measurement data into data having a more detailed resolution. In the method in the related art, the resolution of the structured data is changed and regenerated in accordance with the change in the resolution of the measurement data. However, in the first embodiment, the parameter calculation unit 105 creates structured data with the required minimum resolution at the beginning of the processing, and the same structured model data is reused without regenerating structured data according to the resolution of the measurement data.

According to the first embodiment described above, the data structuring calculation time in the data structure-type neighborhood point search can be shortened, for example, it is possible to shorten calculation time for calculating the gripping position of the product by the robot arm.

According to the first embodiment, the K neighborhood point searching unit 112 and the rotation and translation matrix estimating unit 113 arrange the structured model data that is frequently referred to in the internal memory 108 instead of the external memory 152, and thereby speeding up is achieved, for example, it is possible to shorten the calculation time for calculating the gripping position of the product by the robot arm.

Second Embodiment

In a second embodiment, an outline of a mode in which an accelerator is incorporated in order to speed up the arithmetic processing will be described. As shown in FIG. 4A, the three-dimensional position and posture recognition device according to the second embodiment includes a sensor unit 150, an external memory 152, and a general-purpose processing unit 141, an accelerator A 142, and an accelerator B 143 that constitute processing units. The configuration and the like of the sensor unit 150 are similar as those of the first embodiment. For the neighborhood point search, a hierarchical graph type neighborhood point search method is used. The accelerator A 142 and the accelerator B 143 are configured by, for example, an FPGA or an ASIC.

A method such as deep learning is used in the image recognition unit 103. There is a problem in that the required calculation number of times is large, and a general-purpose calculator represented by a CPU requires a long calculation time and consumes a large amount of power. Therefore, by using hardware specialized for parallel calculation, such as a GPU or an application specific integrated circuit (ASIC), as an accelerator, it is possible to shorten the calculation time.

In this case, a two-dimensional image including a plurality of pieces of pixel data of the recognition target object acquired by the image sensor 101 is transmitted to an accelerator module A 142 via the general-purpose processing unit 141. The image recognition unit 103 is executed on the accelerator module A 142. Similar as in the first embodiment, in a recognition result, the object type is transmitted to the external memory and used to call out the model data 104. Region coordinate data of the object is transmitted to the parameter calculating unit 105 of the general-purpose processing unit 141.

In an ICP algorithm using the data structure-type neighborhood point search, data rearrangement processing and data access processing time in the neighborhood point search is a problem, and the calculation time is long. Therefore, in order to speed up the processing, ICP algorithm processing is performed in the accelerator module B 143. By implementing processing of the data structuring calculation 408, the K neighborhood search processing unit 112 that frequently refers to the structured model data and performs calculation, and the processing of rotation and translation estimating unit 113 in the same accelerator module B, the structured model data is stored in the internal memory or the register without being sequentially stored in the external memory, so that data movement can be minimized and the calculation time can be shortened.

FIG. 4B is a hardware configuration diagram of the three-dimensional position and posture recognition device according to the second embodiment. The three-dimensional position and posture recognition device 100 includes an interface 121 for communicating with an external device, an input and output device (not shown), a processing unit (central processing unit) 122, the memory 108, the storage device 152 including an HDD, an SSD, and the like, an accelerator A 142, and an accelerator B 143.

The CPU 122 reads the various programs 109 to 110 stored in the storage device 152 into the memory 108 and executes the various programs, and thereby achieves various functions. The memory 108 stores various programs executed by the CPU 122 and temporarily stores processing results of the CPU 122.

Here, the various programs are the image matching unit 109 and the point cloud generating unit 110 described with reference to FIG. 4A. The accelerator A 142 implements the processing of the image recognition unit 103 shown in FIG. 1A by hardware. The accelerator B 143 implements the processing of the data thinning unit 106 and the data structuring unit 107 shown in FIG. 1A by hardware. The accelerator B 143 will be described in detail with reference to FIG. 5.

FIG. 5 is a diagram showing the accelerator module B 143. The arithmetic circuit 501 of the accelerator A 142 determines the object type from the image of the image sensor 101 of the sensor unit 150. In the arithmetic circuit 501, an address is transmitted toward the external memory 152 based on the object type, and model data is called out. The model data is transmitted to the accelerator module B 143 via an interface 502. The model data is stored as structured model data in an internal memory for structural data 507 after the resolution conversion unit 111 performs resolution conversion processing. At the same time, the measurement data measured by the point cloud generating unit 110 in FIG. 4 is also transmitted to the accelerator module B 143 and stored in an internal memory for measurement data 506 as measurement point cloud data.

In the hierarchical graph type neighborhood point search method, as shown in FIG. 3, the graph in which data points are connected to each other as vertices is constructed, a distance between the data points is calculated, and the calculated distance is stored as the length of the side. Only K sides of the graph are selected in ascending order and stored in the internal memory for structural data 507. When the processing is achieved by the general-purpose processing unit, many references to the external memory occur in the rearranging processing, and processing time is extended. Therefore, the arithmetic processing is performed by the accelerator module B 143 including the internal memory for measurement data 506 and the internal memory for structural data 507, which are sufficient inside, and including a rearrangement arithmetic circuit 509 of a data flow type capable of executing a rearrangement processing without referring to the external memory 152.

FIG. 6 is a diagram showing a graph-structured circuit. A plurality of (K) pieces of data are collectively read out from the model data stored in the internal memory for structural data 507, one is transmitted as Query and the other is transmitted as Candidate to a distance calculation module 508. In the distance calculation module 508, a plurality of distance calculation circuits 603 are arranged in parallel, and Query data is collectively transmitted to all distance calculation circuits.

For example, in the example shown in FIG. 3C, for the Query Point [1], for a plurality of candidates [2], [3], and [4], the distance calculation circuit 603 calculates distances in parallel respectively.

The candidates are transmitted to the distance calculation circuit 603, respectively. The calculated distance is transmitted to the rearrangement circuit 509, and the top K candidates having short distances are calculated. The selected K pieces of data are registered in the internal memory 507 as Neighbor points. The rearrangement circuit 509 is realized as a dedicated arithmetic circuit on an accelerator module B 143. At this time, the rearranged intermediate data is held in an internal register 605. In a general-purpose arithmetic unit in the related art, intermediate data is also stored in an external memory, and an enormous amount of processing time and power are required for reading from and writing to the external memory. According to the second embodiment, an access to the external memory by the internal register 605 can be minimized, and the calculation time can be shortened. The accelerator modulator B143 can be designed by an FPGA having abundant internal memory and register.

By the above processing, the rotation and translation matrix satisfying the condition in the rotation and translation estimating unit 113 is calculated. The target gripping coordinates are calculated and output by multiplying the gripping coordinates held in the internal memory for structural data 507 by the obtained rotation and translation matrix.

According to the second embodiment described above, the data structuring calculation time in the data structure-type neighborhood point search can be shortened, for example, it is possible to shorten calculation time for calculating the gripping position of the product by the robot arm.

According to the second embodiment, the K neighborhood point searching unit 112 and the rotation and translation matrix estimating unit 113 arrange the structured model data that is frequently referred to in the internal memory for structural data 507 and the internal memory for measurement data 506 instead of the external memory 152, and thereby speeding up is achieved, for example, it is possible to shorten the calculation time for calculating the gripping position of the product by the robot arm.

Furthermore, according to the second embodiment, by the hardware configuration that efficiently structures data in a hierarchical graph type, for example, it is possible to further speed up the calculation of the gripping position of the product by the robot arm.

REFERENCE SIGN LIST

101: image sensor
102: depth sensor
103: image recognition unit
104: model data group
105: parameter calculating unit
106: data thinning unit
107: data structuring unit
108: internal memory
109: image matching unit
110: point cloud generating unit
111: resolution conversion unit
112: K neighborhood point searching unit
113: rotation and translation estimating unit
114: repeated loop processing
115: repeated loop processing
142: accelerator A
143: accelerator B
160: robot arm
506: internal memory for measurement data
507: internal memory for structural data
508: distance calculation module
509: rearrangement arithmetic circuit
605: register in rearrangement circuit

The invention claimed is:

1. A three-dimensional position recognition device, comprising:
   an external memory configured to store model data of each object;
   a sensor unit configured to acquire distance information between a two-dimensional image of an object and the object;
   an image recognition unit configured to output an object type and an object region coordinate based on the two-dimensional image of the object acquired by the sensor unit;
   a parameter calculating unit configured to output resolution for each object based on the object type and the object region coordinate from the image recognition unit, and an allowable error for each object;
a data thinning unit configured to output, based on the resolution from the parameter calculating unit, thinned data from model data of the object read from the external memory according to the object type from the image recognition unit;
a data structuring unit configured to generate structured model data from the thinned data;
an internal memory configured to store the structured model data generated by the data structuring unit;
a point cloud generating unit configured to generate the measurement point cloud data from the two-dimensional image acquired from the sensor unit;
a resolution conversion unit configured to output the measurement point cloud data as measurement point cloud data of a plurality of resolutions after resolution conversion;
a K neighborhood point searching unit configured to perform K neighborhood point search using the structured model data stored in the internal memory and the predetermined measurement point cloud data from the resolution conversion unit;
a rotation and translation estimating unit configured to perform rotation and translation estimation using output of the K neighborhood point searching unit, and the structured model data stored in the internal memory;
a first loop that repeats processing of the K neighborhood point searching unit and the rotation and translation estimating unit until an error of the structured model data stored in the internal memory and the measurement point cloud data of the resolution conversion unit is a certain value or less; and
a second loop that repeats the processing of the K neighborhood point searching unit and the rotation and translation estimating unit with respect to measurement point cloud data of the plurality of the resolutions from the resolution conversion unit.

2. The three-dimensional position recognition device according to claim 1, further comprising:
first accelerator hardware, which is a Field Programmable Gate Array (FPGA) or an application-specific integrated circuit (ASIC);
second accelerator hardware, which is a Field Programmable Gate Array (FPGA) or an application-specific integrated circuit (ASIC); and
a processor,
wherein the image recognition unit is executed on the first accelerator hardware,
wherein the data structuring unit, the resolution conversion unit, the K neighborhood point searching unit and the rotation and translation estimating unit are executed on the second accelerator hardware, and
wherein the point cloud generating unit and the parameter calculating unit are executed on the processor.

3. The three-dimensional position recognition device according to claim 1, further comprising:

a distance calculation module configured to set one measurement point cloud data as a query point, and calculate in parallel distances to a plurality of points of the structured model data stored in the internal memory for structural data relative to the query point.

4. A three-dimensional position recognition method of an object in a three-dimensional position recognition device, comprising steps of:
storing model data of each object by an external memory;
measuring a distance between an image of an object and the object by a sensor unit;
outputting, by an image recognition unit, an object type and an object region coordinate based on the two-dimensional image of the object acquired by the sensor unit;
outputting, by a parameter calculating unit, resolution for each object based on the object type and the object region coordinate from the image recognition unit, and an allowable error for each object;
outputting, by a data thinning unit, based on the resolution from the parameter calculating unit, thinned data from model data of the object read from the external memory according to the object type from the image recognition unit;
generating, by a data structuring unit, structured model data from the thinned data;
storing, by an internal memory, the structured model data generated by the data structuring unit;
generating, by a point cloud generating unit, the measurement point cloud data from the two-dimensional image acquired from the sensor unit;
outputting, by a resolution conversion unit, the measurement point cloud data as measurement point cloud data of a plurality of resolutions after resolution conversion;
performing, by a K neighborhood point searching unit, K neighborhood point search using the structured model data stored in the internal memory and the predetermined measurement point cloud data from the resolution conversion unit;
performing, by a rotation and translation estimating unit, rotation and translation estimation using output of the K neighborhood point searching unit, and the structured model data stored in the internal memory;
repeating, by a first loop, processing of the K neighborhood point searching unit and the rotation and translation estimating unit until an error of the structured model data stored in the internal memory and the measurement point cloud data of the resolution conversion unit is a certain value or less; and
repeating, by a second loop, the processing of the K neighborhood point searching unit and the rotation and translation estimating unit with respect to measurement point cloud data of the plurality of the resolutions from the resolution conversion unit.

* * * * *